United States Patent
Kim et al.

(10) Patent No.: US 11,677,919 B2
(45) Date of Patent: Jun. 13, 2023

(54) IMAGE PROCESSING METHOD AND APPARATUS

(71) Applicants: Samsung Electronics Co., Ltd., Suwon-si (KR); Korea University Research and Business Foundation, Seoul (KR)

(72) Inventors: Jong-Ok Kim, Seoul (KR); Jun-Sang Yoo, Seoul (KR); Chan-Ho Lee, Seoul (KR)

(73) Assignees: Samsung Electronics Co., Ltd., Suwon-si (KR); Korea University Research and Business Foundation, Seoul (KR)

( * ) Notice: Subject to any disclaimer, the term of this patent is extended or adjusted under 35 U.S.C. 154(b) by 121 days.

(21) Appl. No.: 17/336,362

(22) Filed: Jun. 2, 2021

(65) Prior Publication Data

US 2022/0174250 A1 Jun. 2, 2022

(30) Foreign Application Priority Data

Dec. 2, 2020 (KR) ........................ 10-2020-0166955

(51) Int. Cl.
*H04N 1/60* (2006.01)
*H04N 9/77* (2006.01)
(Continued)

(52) U.S. Cl.
CPC ............. *H04N 9/77* (2013.01); *G06N 3/045* (2023.01); *G06N 3/08* (2013.01); *G06T 7/90* (2017.01);
(Continued)

(58) Field of Classification Search
CPC ....... H04N 9/64; H04N 9/68–78; G03N 3/045
(Continued)

(56) References Cited

U.S. PATENT DOCUMENTS 7,817,870 B2  10/2010  Rising et al.
8,928,775 B2   1/2015  Lee
(Continued)

FOREIGN PATENT DOCUMENTS

| JP | 7-131815 A | 5/1995 |
| JP | 2002-543695 A | 12/2002 |
| KR | 10-2019-0090141 A | 8/2019 |

OTHER PUBLICATIONS

Shen, Hui-Liang, et al., "Chromaticity-based separation of reflection components in a single image," *Pattern Recognition*, 41, 8, 2008 (pp. 2461-2469).

(Continued)

*Primary Examiner* — Anthony J Daniels
(74) *Attorney, Agent, or Firm* — NSIP Law

(57) ABSTRACT

An image processing method and apparatus is disclosed, where the image processing method includes receiving an image including frames captured over a time period in an illumination environment including alternating current (AC) light, estimating a specular chromaticity and a diffuse chromaticity of the image based on the frames, determining a weight of each of the specular chromaticity and the diffuse chromaticity based on a frame of the frames, and correcting the image based on the specular chromaticity, the diffuse chromaticity, the weight of the specular chromaticity, and the weight of the diffuse chromaticity.

20 Claims, 7 Drawing Sheets

(51) Int. Cl.
*G06T 7/90* (2017.01)
*G06N 3/08* (2023.01)
*H04N 9/73* (2023.01)
*G06N 3/045* (2023.01)
*H04N 23/71* (2023.01)
*H04N 23/76* (2023.01)
*H04N 23/745* (2023.01)

(52) U.S. Cl.
CPC .............. *H04N 9/73* (2013.01); *H04N 23/71* (2023.01); *H04N 23/76* (2023.01); *G06T 2207/20081* (2013.01); *G06T 2207/20084* (2013.01); *H04N 23/745* (2023.01)

(58) Field of Classification Search
USPC .................................................. 348/207.99
See application file for complete search history.

(56) References Cited

U.S. PATENT DOCUMENTS

| | | | |
|---|---|---|---|
| 10,504,216 B2 | 12/2019 | Van Der Vleuten et al. | |
| 10,713,516 B2 | 7/2020 | Hu et al. | |
| 2009/0046928 A1 | 2/2009 | Kwak et al. | |
| 2013/0335434 A1* | 12/2013 | Wang | G06T 15/506 |
| | | | 345/581 |
| 2016/0307489 A1* | 10/2016 | Nakajima | G09G 3/2003 |
| 2018/0226054 A1* | 8/2018 | Li | G06T 1/20 |
| 2018/0293711 A1* | 10/2018 | Vogels | G06F 17/10 |
| 2020/0160593 A1* | 5/2020 | Gu | G06N 3/08 |
| 2020/0273237 A1* | 8/2020 | Sunkavalli | G06T 19/20 |
| 2020/0374443 A1 | 11/2020 | Kim et al. | |
| 2022/0164601 A1* | 5/2022 | Lo | G06V 10/56 |

OTHER PUBLICATIONS

Yang, Qingxiong, et al., "Efficient and Robust Specular Highlight Removal," *IEEE transactions on pattern analysis and machine intelligence*, 37, 6, 2014 (pp. 1304-1311).

Yamamoto, Takahisa et al., "General Improvement Method of Specular Component Separation Using High-Emphasis Filter and Similarity Function," *ITE Transactions on Media Technology and Applications*, 7, 2, 2019 (pp. 92-102).

Yoo, Jun-Sang, et al., "Dichromatic Model Based Temporal Color Constancy for AC Light Sources," *Proceedings of the IEEE/CVF Conference on Computer Vision and Pattern Recognition*, 2019, (pp. 1-10).

Krebs, Alexandre, et al., "Intrinsic RGB and multispectral images recovery by independent quadratic programming," *PeerJ Computer Science*, 6, 2020 (pp. 1-15).

* cited by examiner

IMAGE PROCESSING METHOD AND APPARATUS

CROSS-REFERENCE TO RELATED APPLICATIONS

This application claims the benefit under 35 USC § 119(a) of Korean Patent Application No. 10-2020-0166955 filed on Dec. 2, 2020, in the Korean Intellectual Property Office, the entire disclosure of which is incorporated herein by reference for all purposes.

BACKGROUND

Field

The following description relates to an image processing method and apparatus.

2. Description of Related Art

A statistical color constancy technology may estimate illumination using statistical characteristics of an image. In an example, a statistical illumination estimation technology may correct illumination by adjusting an average red, green, blue (RGB) ratio of an input image to be 1:1:1, assuming that an average RGB ratio corresponds to an achromatic color. Statistical color constancy technology has a relatively low complexity and a high algorithm operating speed, and some examples include gray-world, gray-edge, shade of gray, and gray-pixel. The statistical technology may be low in complexity, but the performance may be degraded greatly when a corresponding statistical model is not appropriately matched.

A physical color constancy technology may use a dichromatic reflection model, and estimate illumination by estimating a plane or a straight line using pixels at different positions in an image. Pixels that are present at different positions in an image and have the same specular chromaticity and diffuse chromaticity may be extracted to accurately estimate the plane or the straight line. However, when the specular region in the image is not sufficient, the performance may be degraded.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, there is provided an image processing method including receiving an image including frames captured over a time period in an illumination environment including alternating current (AC) light, estimating a specular chromaticity and a diffuse chromaticity of the image based on the frames, determining a weight of each of the specular chromaticity and the diffuse chromaticity based on a frame of the frames, and correcting the image based on the specular chromaticity, the diffuse chromaticity, the weight of the specular chromaticity, and the weight of the diffuse chromaticity.

The weight of the specular chromaticity may correspond to a size of the specular chromaticity included in a pixel value of a pixel in the frame.

The diffuse chromaticity may include a plurality of diffuse chromaticities corresponding to actual colors of an object present in the frame.

The weight of the diffuse chromaticity may correspond to a size of a diffuse chromaticity included in a pixel value of a pixel in the frame from among the plurality of diffuse chromaticities.

The estimating of the specular chromaticity and the diffuse chromaticity may include obtaining a chromaticity dictionary matrix including the specular chromaticity and the diffuse chromaticity by inputting the frames to a chromaticity dictionary branch network.

The obtaining of the chromaticity dictionary matrix may include inputting a concatenation of the frames to a first neural network, inputting an output of the first neural network to a plurality of second neural networks, and concatenating respective outputs of the plurality of the second neural networks.

The estimating of the weight may include obtaining a coefficient matrix including the weight of the specular chromaticity and the weight of the diffuse chromaticity by inputting the frame to a coefficient branch network.

The correcting may include performing color balancing or highlight removal on the image based on the specular chromaticity, the diffuse chromaticity, the weight of the specular chromaticity, and the weight of the diffuse chromaticity.

In another general aspect, there is provided a training method to train a neural network for image processing, including receiving an image including frames captured over a time period in an illumination environment including alternating current (AC) light, obtaining a chromaticity dictionary matrix including a specular chromaticity and a diffuse chromaticity by inputting a portion of the frames to a first neural network, obtaining a coefficient matrix including a weight of the specular chromaticity and a weight of the diffuse chromaticity by inputting a frame of the portion of the frames to a second neural network, and training the first neural network and the second neural network based on a loss function for the chromaticity dictionary matrix and the coefficient matrix.

The loss function may be determined based on a sum of a reconstruction loss function based on an error between the frame and a product of a multiplication between the chromaticity dictionary matrix and the coefficient matrix, a color constancy loss function based on a difference between the specular chromaticity and an actual chromaticity of the AC light, a coefficient loss function based on each component of the coefficient matrix, and a temporal loss function based on a chromaticity dictionary matrix obtained for a portion of the frames and a coefficient matrix obtained for a frame among the frames.

The coefficient loss function may be based on a sum of a normalization loss function based on a sum of components of a pixel value of a pixel in the frame and a sum of column components of a coefficient matrix corresponding to the pixel, a specular loss function based on the weight of the specular chromaticity, and a diffuse loss function based on the weight of the diffuse chromaticity.

In another general aspect, there is provided an image processing apparatus including a processor configured to receive an image including frames captured over a time period in an illumination environment including alternating current (AC) light, estimate a specular chromaticity and a diffuse chromaticity of the image based on the frames, determine a weight of each of the specular chromaticity and the diffuse chromaticity based on a frame of the frames, and correct the image based on the specular chromaticity, the diffuse chromaticity, the weight of the specular chromaticity, and the weight of the diffuse chromaticity.

The weight of the specular chromaticity may correspond to a size of the specular chromaticity included in a pixel value of a pixel in the frame.

The diffuse chromaticity may include a plurality of diffuse chromaticities corresponding to actual colors of an object present in the frame.

The weight of the diffuse chromaticity may correspond to a size of a diffuse chromaticity included in a pixel value of a pixel in the frame from among the diffuse chromaticities.

The processor may be configured to obtain a chromaticity dictionary matrix including the specular chromaticity and the diffuse chromaticity by inputting the frames to a chromaticity dictionary branch network.

The processor may be configured to input a concatenation of the frames to a first neural network, input an output of the first neural network to a plurality of second neural networks, and concatenate respective outputs of the plurality of the second neural networks.

The processor may be configured to obtain a coefficient matrix including the weight of the specular chromaticity and the weight of the diffuse chromaticity by inputting the frame to a coefficient branch network.

The processor may be configured to perform color balancing or highlight removal on the image based on the specular chromaticity, the diffuse chromaticity, the weight of the specular chromaticity and the weight of the diffuse chromaticity.

Other features and aspects will be apparent from the following detailed description, the drawings, and the claims.

BRIEF DESCRIPTION OF THE DRAWINGS

FIGS. 5A through 5C illustrate examples of image correction performed by the image processing apparatus of FIG. 1.

Figure 1:
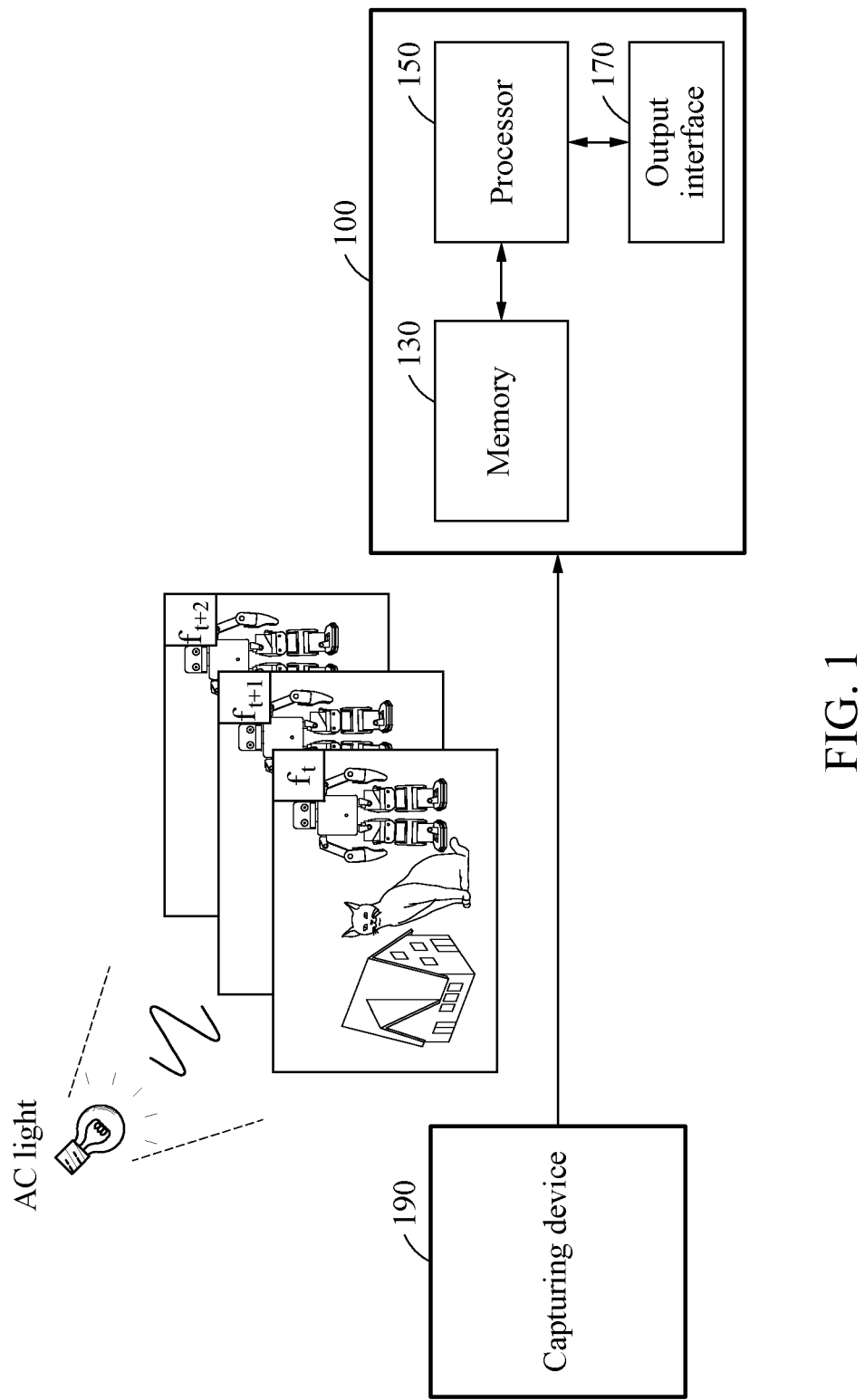
FIG. 1 illustrates an example of an image processing apparatus.

Throughout the drawings and the detailed description, unless otherwise described or provided, the same drawing reference numerals will be understood to refer to the same elements, features, and structures. The drawings may not be to scale, and the relative size, proportions, and depiction of elements in the drawings may be exaggerated for clarity, illustration, and convenience.

DETAILED DESCRIPTION

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order. Also, descriptions of features that are known in the art may be omitted for increased clarity and conciseness.

The features described herein may be embodied in different forms and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application.

The terminology used herein is for the purpose of describing particular examples only and is not to be limiting of the examples. As used herein, the singular forms (for example, "a", "an", and "the") are intended to include the plural forms as well, unless the context clearly indicates otherwise. As used herein, the term "and/or" includes any one and any combination of any two or more of the associated listed items. As used herein, the terms "include," "comprise," "has," and "have" specify the presence of stated features, integers, steps, operations, elements, components, numbers, and/or a combination thereof, but do not preclude the presence or addition of one or more other features, integers, steps, operations, elements, components, numbers, and/or combinations thereof.

If the specification states that one component is "connected," "coupled," or "joined" to a second component, the first component may be directly "connected," "coupled," or "joined" to the second component, or a third component may be "connected," "coupled," or "joined" between the first component and the second component. However, if the specification states that a first component is "directly connected" or "directly joined" to a second component, a third component may not be "connected" or "joined" between the first component and the second component. Similar expressions, for example, "between" and "immediately between" and "adjacent to" and "immediately adjacent to," are also to be construed in this manner.

Although terms such as first, second, A, B, (a), (b) may be used herein to describe various members, components, regions, layers, or sections, these members, components, regions, layers, or sections are not to be limited by these terms. Rather, these terms are only used to distinguish one member, component, region, layer, or section from another member, component, region, layer, or section. Thus, a first member, component, region, layer, or section referred to in the examples described herein may also be referred to as a second member, component, region, layer, or section without departing from the teachings of the examples.

The use of the term "may" herein with respect to an example or embodiment (for example, as to what an example or embodiment may include or implement) means that at least one example or embodiment exists where such a feature is included or implemented, while all examples are not limited thereto.

Also, in the description of example embodiments, detailed description of structures or functions that are thereby known after an understanding of the disclosure of the present application will be omitted when it is deemed that such description will cause ambiguous interpretation of the example embodiments.

FIG. 1 illustrates an example of an image processing apparatus.

An image processing apparatus 100 may correct an image. In an example, the image processing apparatus 100 may improve a color quality performance of the image through color balancing and/or highlight removal.

In an example, the image processing apparatus 100 may correct the image based on a dichromatic reflection model. The image processing apparatus 100 may estimate the dichromatic reflection model of the image and improve the color quality performance of the image based on the estimated dichromatic reflection model.

The image processing apparatus 100 may estimate the dichromatic reflection model of the image including a plurality of frames captured over a period of time through a capturing device 170 in an illumination environment, which includes alternating current (AC) light.

In an example, the AC light may refer to light whose intensity changes periodically with time. In an example, the AC light may be light of a sinusoidal form having a frequency of 60 hertz (Hz). The AC light may be generated by an AC light source. The illumination environment may not only include an environment including only the AC light, but also an environment in which direct current (DC) light and AC light are mixed.

The capturing device 170 may capture an image of an object according to the passage of time in an illumination environment, which includes AC light, and generate the image including a plurality of frames. The capturing device 170 may capture the image at a capturing speed of frames per second (fps), which is greater than or equal to the frequency (Hz) of the AC light. For example, when the AC light has a frequency of 60 Hz, the capturing device 170 may capture the image at a speed that is greater than or equal to 60 fps. Although the capturing device 170 is illustrated in FIG. 1 as being separate from the image processing device 100, examples are not limited thereto. For example, the capturing device 170 may a single device that is integral with the image processing apparatus 100.

The image including the frames, for example, $f_t$, $f_{t+1}$, and $f_{t+2}$, that are captured according to the lapse of time may be generated in the illumination environment including the AC light, and may thus have different sets of image information based on the time that the frame was captured. In an example, the frames $f_t$, $f_{t+1}$, and $f_{t+2}$ may have different pixel values based on time even for a pixel corresponding to the same position in each frame.

A pixel value may include brightness information of a pixel, and may also be referred to as a pixel value or a pixel intensity. The pixel value may be a value between 0 and 255, and a greater pixel value may indicate a higher brightness or intensity of the pixel. In an example, the pixel value may be represented by a plurality of sub-pixel values. For example, in a case of a color image, a pixel value may be represented as a value of a pixel of a red component, a value of a pixel of a green component, a value of a pixel of a blue component, i.e., the pixel value may be represented in a form of a 3×1 matrix. In such a case of the color image, by combining the red component, the green component, and the blue component, it is possible to generate various colors. When a pixel value is represented as a value between 0 and 255, a corresponding pixel may produce $256^3$ colors.

Referring to FIG. 1, the image processing apparatus 100 includes a memory 130, a processor 150, and an output interface 170.

The memory 130 may store instructions (or a program) executable by the processor 150. For example, the instructions may include instructions for executing an operation of the processor 150 and/or an operation of each component of the processor 150. The memory 130 may be embodied as a volatile or nonvolatile memory device.

In an example, the volatile memory device may be, for example, a dynamic random-access memory (DRAM), a static RAM (SRAM), a thyristor RAM (T-RAM), a zero-capacitor RAM (Z-RAM), or a twin-transistor RAM (TTRAM).

In an example, the nonvolatile memory device may be, for example, an electrically erasable programmable read-only memory (EEPROM), a flash memory, a magnetic RAM (MRAM), a spin-transfer torque (STT) MRAM (STT-MRAM), a conductive bridging RAM (CBRAM), a ferroelectric RAM (FeRAM), a phase-change RAM (PRAM), a resistive RAM (RRAM), a nanotube RRAM, a polymer RAM (PoRAM), a nano-floating gate memory (NFGM), a holographic memory, a molecular electronic memory device, or an insulator resistance change memory. Further description of the memory 130 is given below.

The memory 130 may store a matrix on which an operation included in a neural network may be performed. The memory 130 may store a result of the operation that is processed and generated by the processor 150.

The processor 150 may process data stored in the memory 130. The processor 150 may execute a computer-readable code (e.g., software) stored in the memory 130 and instructions induced by the processor 150.

The processor 150 may be a hardware-implemented apparatus having a circuit that is physically structured to execute desired operations. For example, the desired operations may be implemented by execution of code or instructions. The hardware-implemented apparatus may include, for example, a microprocessor, a central processing unit (CPU), single processor, independent processors, parallel processors, single-instruction single-data (SISD) multiprocessing, single-instruction multiple-data (SIMD) multiprocessing, multiple-instruction single-data (MISD) multiprocessing, multiple-instruction multiple-data (MIMD) multiprocessing, a controller and an arithmetic logic unit (ALU), a DSP, a microcomputer, a processor core, a multi-core processor, and a multiprocessor, an application-specific integrated circuit (ASIC), a field programmable gate array (FPGA), a programmable logic unit (PLU), a central processing unit (CPU), a graphics processing unit (GPU), a neural processing unit (NPU), or any other device capable of responding to and executing instructions in a defined manner. Further description of the processor 150 is given below.

The image processing apparatus 100 may further include an output interface 170 configured to output an image corrected by the image processing apparatus 100. In an example, the output device may include, for example, a display, such as, for example, computer monitor, smartphone, a smart television (TV), a tablet, a head-up display (HUD) device, a three-dimensional (3D) digital information display (DID), a 3D mobile device, and a smart automobile, display of an advanced driver-assistance systems (ADAS), a navigation device, a three-dimensional (3D) digital information display (DID), a neuromorphic device, an Internet of Things (IoT) device, a medical device, a measurement device, and eye glass display (EGD) that are operatively connected to the image processing apparatus 100. The 3D mobile device may include a display device for displaying an augmented reality (AR), a virtual reality (VR), and/or a mixed reality (MR), a head mounted display (HMD), and a face mounted display (FMD). In an example, the output interface 170 may communicate with an external device through a wired or wireless network to transfer an image corrected by the image processing apparatus 100.

Hereinafter, an image processing method performed by the processor 150 of the image processing apparatus 100 will be described in detail with reference to FIGS. 2 through 5C.

Figure 2:
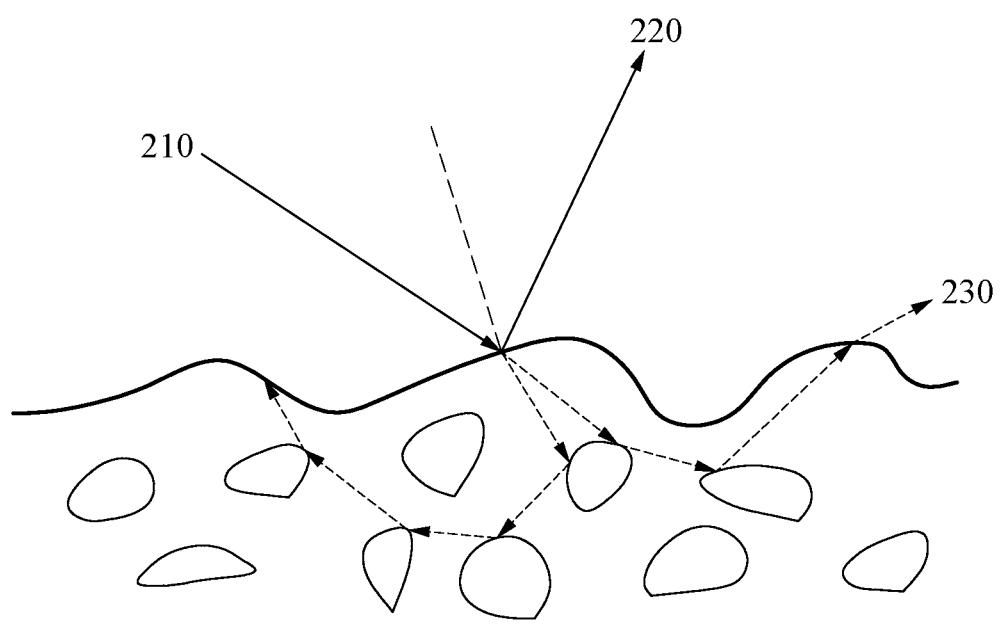
FIG. 2 illustrates an example of a dichromatic model.

FIG. 2 illustrates an example of a dichromatic model.

Based on a dichromatic model, incident light 210 that is incident on an object may be divided into two reflection components 220 and 230—a specular reflection component 220 and a diffuse reflection component 230. The light that is reflected from an object may include the specular reflection component 220 and the diffuse reflection component 230. The specular reflection component 220 may refer to a reflection component that is reflected from a surface of an object. The diffuse reflection component 230 may refer to a reflection component that is transmitted to an object and then diffuses.

Reflected light from an object may consist of a combination of the specular reflection component 220 and the diffuse reflection component 230, which is represented by a pixel value of an image. A pixel value $i^n$ of a pixel included in an image may be represented by Equation 1.

$$i^n = m_s^n \Gamma + m_d^n \Lambda^n \qquad \text{[Equation 1]}$$

In Equation 1, $m_s^n$ denotes a specular parameter, and $\Gamma$ denotes a specular chromaticity. $m_d^n$ denotes a diffuse parameter, and $\Lambda^n$ denotes a diffuse chromaticity. Here, n denotes an index of each pixel.

The specular chromaticity $\Gamma$ and the specular parameter may represent the specular reflection component 220. The specular chromaticity $\Gamma$ may include information associated with a color of illumination, and the specular parameter may include information associated with brightness of the illumination.

The diffuse chromaticity $\Lambda^n$ and the diffuse parameter $m_d^n$ may represent the diffuse reflection component 230. The diffuse chromaticity $\Lambda^n$ may include information associated with an actual color of an object, and the diffuse parameter may include information associated with brightness of the object.

Figure 3:
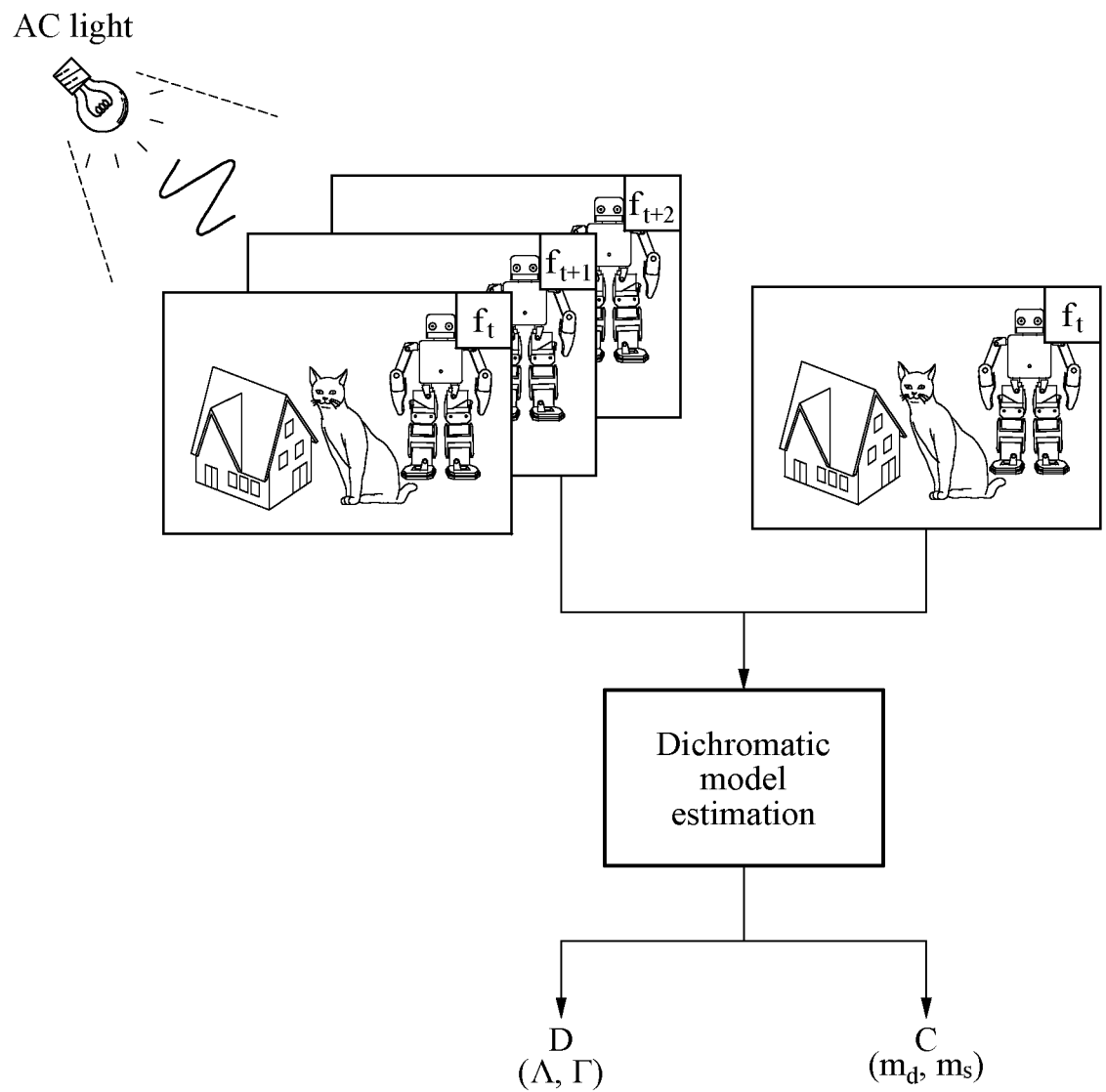
FIG. 3 illustrates an example of dichromatic model estimation performed by the image processing apparatus of FIG. 1.

FIG. 3 illustrates an example of dichromatic model estimation performed by the image processing apparatus 100 of FIG. 1.

Referring to FIG. 3, the image processing apparatus 100 may estimate a dichromatic model for a current frame $f_t$ based on an image including a plurality of frames $f_t$, $f_{t+1}$, and $f_{t+2}$ captured according to the lapse of time, i.e., the plurality of frames are captured over a period of time. In an example, the image processing apparatus 100 may estimate a specular chromaticity $\Gamma$ and a diffuse chromaticity $\Lambda^n$ for the current frame $f_t$ based on the frames $f_t$, $f_{t+1}$, and $f_{t+2}$. The image processing apparatus 100 may also estimate a specular parameter $m_s^n$ and a diffuse parameter based on the current frame $f_t$.

In an example the image processing apparatus 100 may represent the dichromatic model in a form of a matrix, and transform the estimation of parameters of the dichromatic model into matrix factorization. For example, to determine parameters of a dichromatic model, the image processing apparatus 100 may obtain a chromaticity dictionary matrix D for estimating a specular chromaticity $\Gamma$ and a diffuse chromaticity $\Lambda^n$, and a coefficient matrix C for estimating a specular parameter $m_s$ and a diffuse parameter ma.

The chromaticity dictionary matrix D and the coefficient matrix C will be further described below.

Equation 1 that represents a pixel value $i^n$ based on the dichromatic model may be transformed into Equation 2. In an example, Equation 2 may be transformed from Equation 1 to represent the dichromatic model based on M diffuse chromaticities $\Lambda_j$.

$$i^n = \alpha^n \Gamma + \sum_{j=1}^{M} \beta_j^n \Lambda_j \qquad \text{[Equation 2]}$$

In Equation 2, $\alpha^n$ and $\beta_j^n$ denote a weight of a specular chromaticity and a weight of a diffuse chromaticity, respectively. The weight $\alpha^n$ of the specular chromaticity and the $\beta_j^n$ of the diffuse chromaticity may be parameters for estimating a specular parameter $m_s^n$ and a diffuse parameter $m_d^n$, respectively.

The weight $\beta_j^n$ of the diffuse chromaticity may be a weight that indicates a magnitude of one diffuse chromaticity $\Lambda_j$ that is selected from among the M diffuse chromaticities $\Lambda_j$, and only one of the weights $\beta_j^n$ of the M diffuse chromaticities $\Lambda_j$ may have a value that is not zero 0. However, examples are not limited thereto. In another example, when a chromaticity that is not the preset M diffuse chromaticities $\Lambda_j$ is present in an image, weights $\beta_j^n$ of a plurality of diffuse chromaticities $\Lambda_j$ may have a value that is not 0 to represent a combination of the diffuse chromaticities $\Lambda_j$.

Equation 2 may be represented as a single matrix equation for all pixels (that is, n), which is Equation 3.

$$(i^1 \ i^2 \ \ldots \ i^N) = (\Gamma \ \Lambda_1 \ \Lambda_2 \ \ldots \Lambda_M) \begin{pmatrix} \alpha^1 & \alpha^2 & \ldots & \alpha^N \\ \beta_1^1 & & & \\ \beta_2^1 & & \ddots & \\ \vdots & & & \\ \beta_M^1 & & & \beta_M^N \end{pmatrix} \qquad \text{[Equation 3]}$$

In Equation 3, $$(\Gamma \ \Lambda_1 \ \Lambda_2 \ \ldots \Lambda_M) \text{ and } \begin{pmatrix} \alpha^1 & \alpha^2 & \ldots & \alpha^N \\ \beta_1^1 & & & \\ \beta_2^1 & & \ddots & \\ \vdots & & & \\ \beta_M^1 & & & \beta_M^N \end{pmatrix}$$

on the left side are the chromaticity dictionary matrix D and the coefficient matrix C, respectively.

When an image is captured at a high speed, there may be no change in the color of illumination and in the color of objects between frames captured at a short interval of time, and thus the frames may all be represented by the same chromaticity dictionary matrix D.

Each column of the chromaticity dictionary matrix D may consist of a single specular chromaticity and M diffuse chromaticities, and thus the size of the chromaticity dictionary matrix D may be 3×(M+1) and a sum of columns thereof may be 1.

In an example, the coefficient matrix C may include a weight that determines the size of the specular chromaticity and the size of the diffuse chromaticity that are included in a pixel value of each pixel. For example, a first row of the coefficient matrix C may include a weight $\alpha^n$ of the specular chromaticity that is applied to a pixel value of each pixel, and second to M+1th rows may include a weight $\beta_j''$ of a diffuse chromaticity that is applied to a pixel value of a pixel from among the M diffuse chromaticities.

The weight $\alpha''$ of the specular chromaticity and the weight $\beta_j''$ of the diffuse chromaticity may be a component that determines brightness of the pixel. Thus, in an example, when an image captured in an illumination environment including AC light, the weight $\alpha''$ of the specular chromaticity and the weight $\beta_j''$ of the diffuse chromaticity may vibrate sinusoidally based on time.

Figure 4:
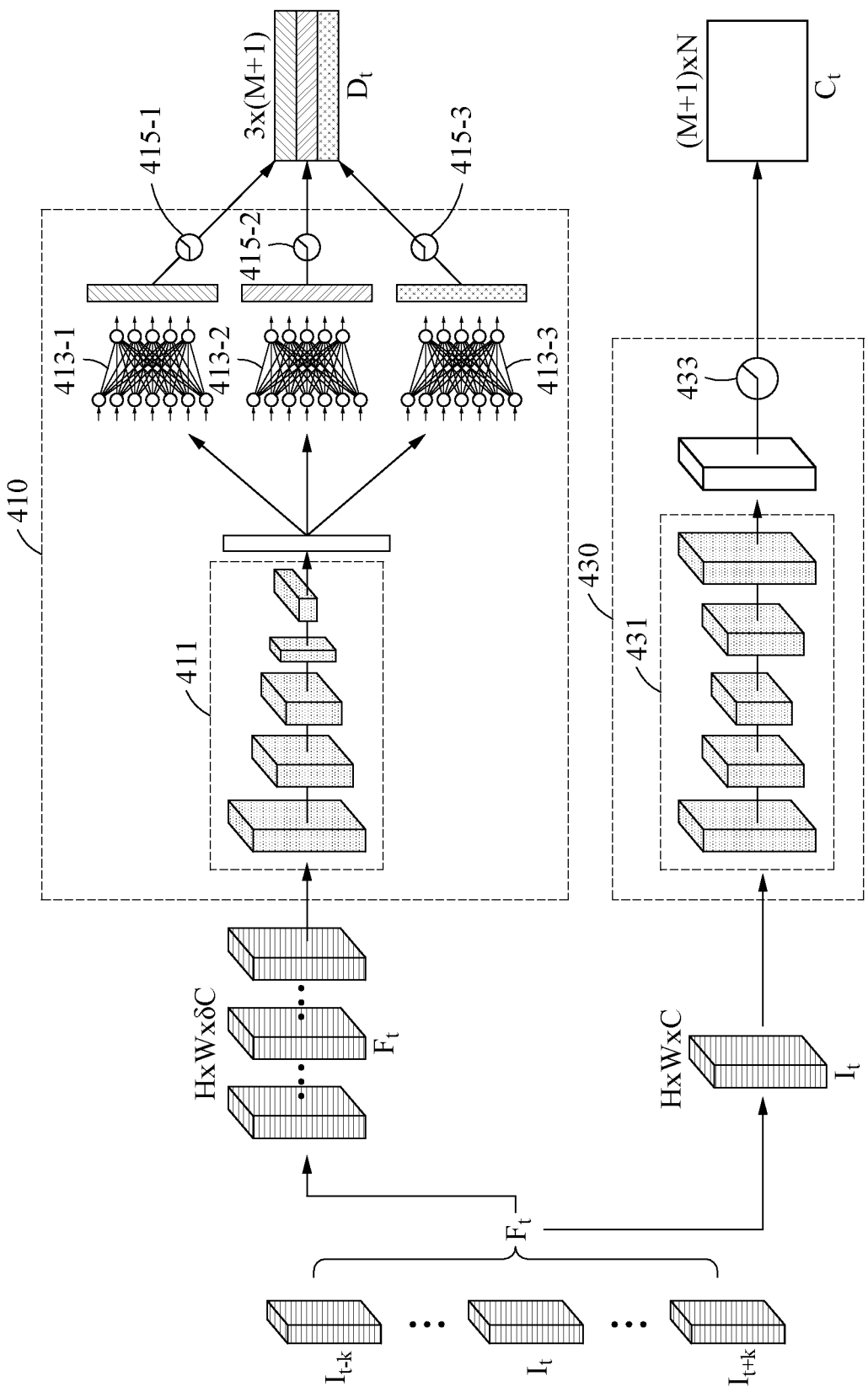
FIG. 4 illustrates an example of the dichromatic model estimation of FIG. 2.

FIG. 4 illustrates an example of the dichromatic model estimation of FIG. 2.

Referring to FIG. 4, the image processing apparatus 100 may estimate a dichromatic model of an image using a neural network. The neural network used for estimating the dichromatic model may include a chromaticity dictionary branch network 410 for estimating a chromaticity dictionary matrix and a coefficient branch network 430 for estimating a coefficient matrix.

The chromaticity dictionary branch network 410 and the coefficient branch network 430 may be networks that are trained by being combined with each other. The learning or the training process of the chromaticity dictionary branch network 410 and the coefficient branch network 430 will be further described in detail with reference to FIGS. 6 and 7.

The image processing apparatus 100 may estimate or determine the chromaticity dictionary matrix by inputting a plurality of frames $F_t$ including a current frame $I_t$ to the chromaticity dictionary branch network 410, and estimate or determine the coefficient matrix for the current frame $I_t$ by inputting the current frame $I_t$ to the coefficient branch network 430.

The frames $F_t$ may include a portion (e.g., $I_{t-k}$ through $I_{t+k}$) of a plurality of frames ($I_1$ through $I_T$) captured according to the lapse of time under an illumination environment including AC light. In an example, the frames $F_t$ may include the current frame $I_t$ and two frames $I_{t-2}$, $I_{t-1}$, and $I_{t+2}$ before and after the current frame $I_t$.

The chromaticity dictionary branch network 410 may include a first neural network 411, a plurality of second neural networks 413-1, 413-2, and 413-3, and a plurality of rectified linear units (ReLUs) 415-1, 415-2, and 415-3. In an example, the first neural network 411 may be an Efficient-Net, and the second neural networks 413-1, 413-2, and 413-3 may be fully-connected networks.

A concatenation of the frames $F_t$ may be input to the first neural network 411. Each of the frames $I_{t-k}$ through $I_{t+k}$ may have a size of H×W×C, and thus the concatenation of the frames $F_t$ may have a size of H×W×δC, in which δ denotes the number of the frames $I_{t-k}$ through $I_{t+k}$ included in the frames $F_t$. The first neural network 411 may output a vector having M+1 components.

The output of the first neural network 411 may be input to each of the second neural networks 413-1, 413-2, and 413-3. Respective outputs of the second neural networks 413-1, 413-2, and 413-3 may pass through the ReLUs 415-1, 415-2, and 415-3, respectively, and then be concatenated or combined. The outputs of the second neural networks 413-1, 413-2, and 413-3 passing through the ReLUs 415-1, 415-2, and 415-3 may form the first through third rows of a chromaticity dictionary matrix $D_t$.

The coefficient branch network 430 may include a neural network 431 and a ReLU 433. The neural network 431 may be a U-net, for example.

The current frame $I_t$ may be input to the neural network 431. An output of the neural network 431 may have the same resolution as the input. For example, the output of the neural network 431 may have a size of H×W×(M+1).

The output of the neural network 431 may be rearranged after passing through the ReLU 433. The output of the neural network 431 passing through the ReLU 433 may be rearranged such that a weight for a corresponding pixel is arranged in each row. The rearranged matrix may be a coefficient matrix $C_t$ for the current frame $I_t$.

Figures 5A, 5B, 5C:
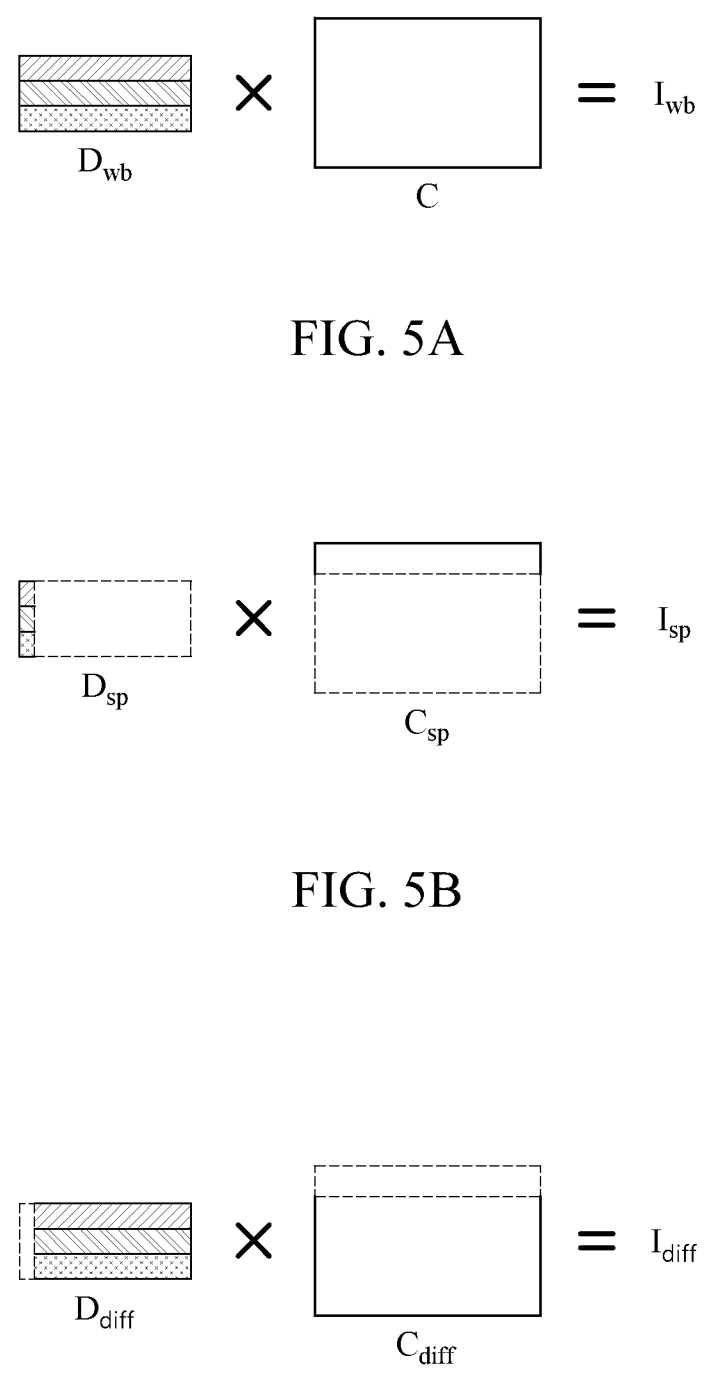

FIGS. 5A through 5C illustrate an example of image correction performed by the image processing apparatus 100 of FIG. 1.

The image processing apparatus 100 may correct a current frame $I_t$ based on an estimated chromaticity dictionary matrix $D_t$ and an estimated coefficient matrix $C_t$.

As illustrated in FIG. 5A, the image processing apparatus 100 may perform white balancing based on the chromaticity dictionary matrix $D_t$ and the coefficient matrix $C_t$. The image processing apparatus 100 may generate a chromaticity dictionary matrix $D_{wb}$ by dividing all columns of the chromaticity dictionary matrix $D_t$ by a specular chromaticity which is a first column of the chromaticity dictionary matrix $D_t$. The image processing apparatus 100 may generate an image $I_{wb}$ to which a color constancy method is applied by multiplying the generated chromaticity dictionary matrix $D_{wb}$ and the coefficient matrix $C_t$.

As illustrated in FIG. 5B, the image processing apparatus 100 may generate a specular image $I_{sp}$ by extracting only a specular component of an image based on the chromaticity dictionary matrix $D_t$ and the coefficient matrix $C_t$. The image processing apparatus 100 may generate a chromaticity dictionary matrix $D_{sp}$ by removing diffuse chromaticities of second to last columns of the chromaticity dictionary matrix $D_t$, and generate a coefficient matrix $C_{sp}$ by removing weights of diffuse chromaticities of second to last rows of the coefficient matrix $C_t$. The image processing apparatus 100 may generate the specular image $I_{sp}$ by multiplying the chromaticity dictionary matrix $D_{sp}$ from which the diffuse chromaticities are removed, and the coefficient matrix $C_{sp}$ from which the weights of the diffuse chromaticities are removed.

As illustrated in FIG. 5C, the image processing apparatus 100 may generate a diffuse image $I_{diff}$ by extracting only a diffuse component of an image based on the chromaticity dictionary matrix $D_t$ and the coefficient matrix $C_t$. The image processing apparatus 100 may generate a chromaticity dictionary matrix $D_{diff}$ by removing a specular chromaticity of a first column of the chromaticity dictionary matrix $D_t$, and generate a coefficient matrix $C_{diff}$ by removing a weight of a specular chromaticity of a first row of the coefficient matrix $C_t$. The image processing apparatus 100 may generate the diffuse image $I_{diff}$ by multiplying the chromaticity dictionary matrix $D_{diff}$ from which the specular chromaticity is removed and the coefficient matrix $C_{diff}$ from which the weight of the specular chromaticity is removed. In an example, the diffuse image $I_{diff}$ may be an image from which reflected light is removed.

Figure 6:
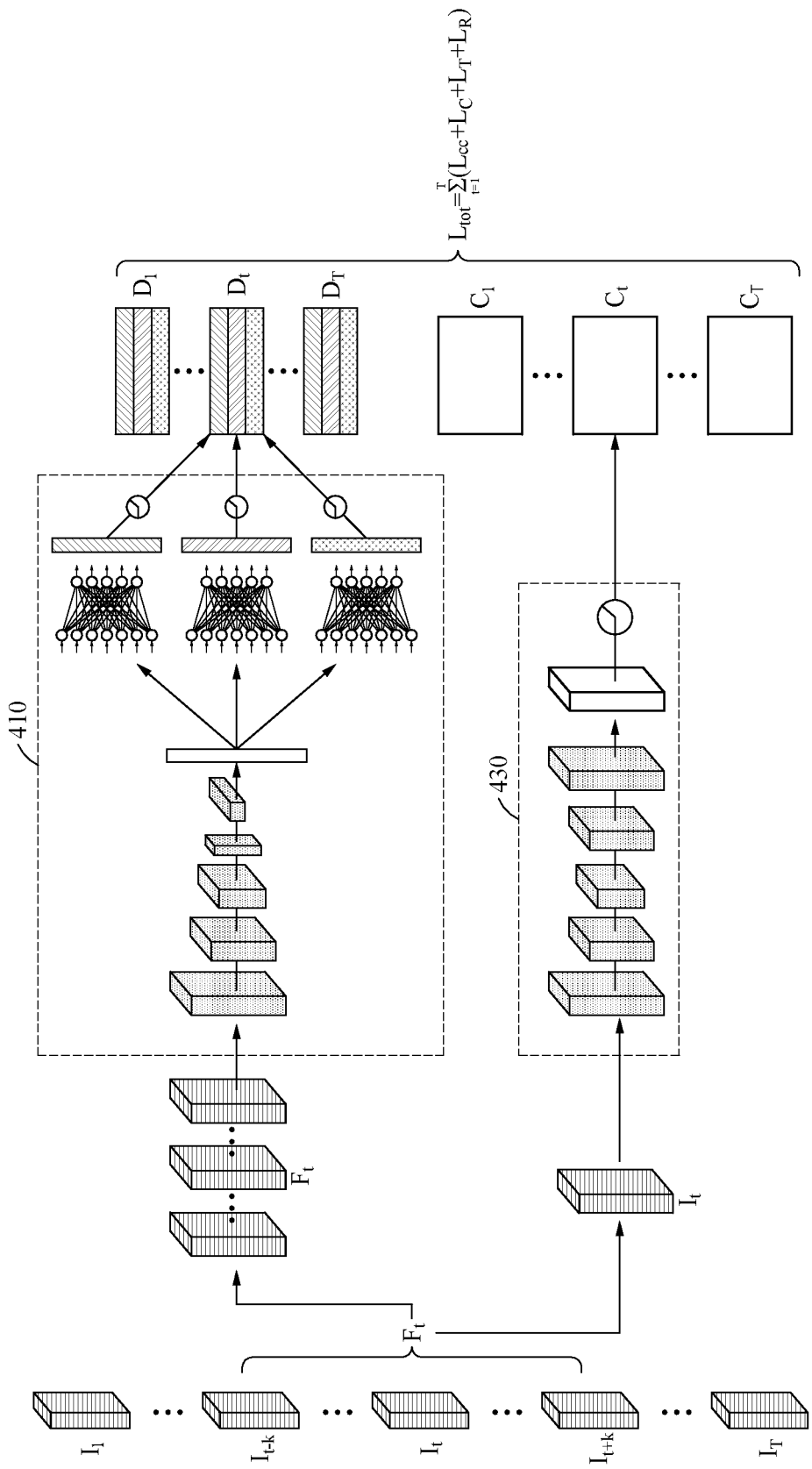
FIG. 6 illustrates an example of training a network for the dichromatic model estimation of FIG. 2.
Figure 7:
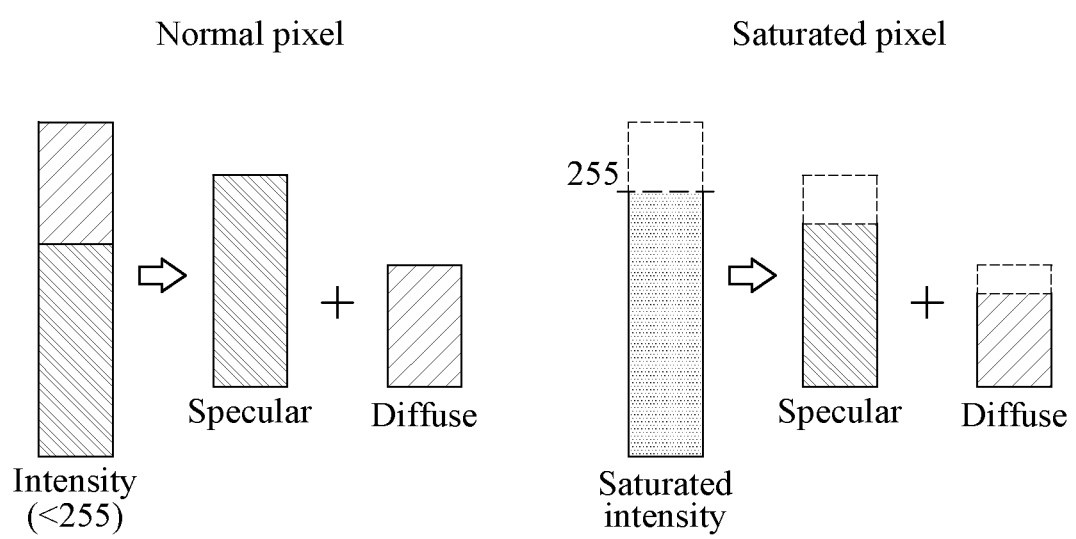
FIG. 7 illustrates an example of learning an image in which a saturated pixel is present.

FIG. 6 illustrates an example of training a network for the dichromatic model estimation of FIG. 2. FIG. 7 illustrates an example of learning an image in which a saturated pixel is present.

FIG. 7 illustrates an example of a normal pixel and a saturated pixel. In the example illustrated in FIG. 7, both the normal pixel and the saturated pixel have a specular and a diffuse components. In the example illustrated in FIG. 7, the normal pixel has an intensity of less than 255 and the saturated pixel has a saturated intensity greater than 255.

The chromaticity dictionary branch network 410 and the coefficient branch network 430 may be jointly trained based on a loss function $L_{tot}$.

The chromaticity dictionary branch network 410 may output a plurality of chromaticity dictionary matrices $D_1$ through $D_T$ based on a plurality of frames $I_1$ through $I_T$ captured over time under a lightning environment, which includes AC light.

A plurality of frames (e.g., $I_{t-k}$ through $I_{t+k}$) including a frame (e.g., $I_t$) may be input to the chromaticity dictionary branch network 410, and a chromaticity dictionary matrix $D_t$ corresponding to the frame $I_t$ may be obtained. This foregoing operation may be repeated for all the frames $I_1$ through $I_T$, and the chromaticity dictionary matrices $D_1$ through $D_T$ respectively corresponding to the frames $I_1$ through $I_T$ may be obtained from the chromaticity dictionary branch network 410. In an example, a plurality of frames $F_t$ including two frames $I_{t-2}$ and $I_{t-1}$ before frame $I_t$, and two frame after $I_t$, $I_{t+1}$, and $I_{t+2}$ of all the frames $I_1$ through $I_T$ may be input to the chromaticity dictionary branch network 410, and the chromaticity dictionary matrices $D_1$ through $D_T$ may then be obtained. In an example, for the first two frames $I_1$ and $I_2$ and the last two frames $I_{T-1}$, and $I_T$, the last one frame $I_T$ or the two frames $I_{T-1}$ and $I_T$, and the first one frame $I_1$ or the two frames $I_1$ and $I_2$ may be included.

The coefficient branch network 430 may output a plurality of coefficient matrices $C_1$ through $C_T$ based on the frames $I_1$ through $I_T$. Each of the frames $I_1$ through $I_T$ may be input to the coefficient branch network 430, and the coefficient matrices $C_1$ through $C_T$ may then be generated.

The loss function $L_{tot}$ may be a function associated with the chromaticity dictionary matrices $D_1$ through $D_T$ and the coefficient matrices $C_1$ through $C_T$. The loss function $L_{tot}$ may be calculated based on the chromaticity dictionary matrices $D_1$ through $D_T$ and the coefficient matrices $C_1$ through $C_T$.

The loss function $L_{tot}$ may be determined based on a sum of a color constancy loss function $L_{cc}$, a coefficient loss function $L_C$, a temporal loss function $L_T$, and a reconstruction loss function $L_R$.

$$L_{tot} = \sum_{t=1}^{T}(L_{cc} + L_C + L_T + L_R) \qquad \text{[Equation 4]}$$

The color constancy loss function $L_{cc}$ may be a function for determining the similarity of a specular chromaticity of a first column of a chromaticity dictionary matrix D to the actual illumination. The color constancy loss function $L_{cc}$ may be determined based on an angular error between an estimated specular chromaticity $\hat{\Gamma}$ and an actual chromaticity $\Gamma_s$ of AC light detected by a color checker. The color constancy loss function $L_{cc}$ may be represented by Equation 5.

$$L_{cc} = E_0(\hat{\Gamma}, \Gamma_s) = \arccos\left(\frac{\hat{\Gamma} \cdot \Gamma_s}{\|\hat{\Gamma}\|\|\Gamma_s\|}\right) \qquad \text{[Equation 5]}$$

where $\hat{\Gamma}=D(:,1)$

The coefficient loss function $L_C$ may be determined based on a sum of a normalization loss function $L_{normal}$, a specular loss function $L_{C,spec}$, and a diffuse loss function $L_{C,diff}$, as represented by Equation 6.

$$L_C = L_{normal} + L_{C,spec} + L_{C,diff} \qquad \text{[Equation 6]}$$

The normalization loss function $L_{normal}$ may be a loss function that determines whether a concatenation of red R, green G, and blue B components of each pixel is equal to (or corresponds to) a sum of weights of a specular chromaticity and a diffuse chromaticity corresponding to each pixel. The normalization loss function $L_{normal}$ may be determined based on a sum of components of pixel values of pixels in a frame and a sum of column components of a coefficient matrix corresponding to the pixels.

$$L_{normal} = \sum_{n=1}^{N}\left\|\sum_{c \in r,g,b} i_c^n - \left(\alpha^n + \sum_{m=1}^{M}\beta_m^n\right)\right\|_2^2 \qquad \text{[Equation 7]}$$

The normalization loss function $L_{normal}$ may not be applied to a saturated pixel of which a pixel value (or intensity) exceeds or meets a threshold value, using a saturation mask. When a pixel value (or intensity) of a saturated region exceeds the threshold value, and an image is decomposed into a specular component and a diffuse component, a hole may be generated after the decomposition due to a limited intensity of each component.

Through the saturation mask, the normalization loss function $L_{normal}$ may not be calculated for the saturated region, and a weight of a specular chromaticity and a weight of a diffuse chromaticity for saturated pixels in the saturated region may be determined based on a distribution of a specular component and a diffuse component of a nearby pixel that is obtained using the specular loss function $L_{C,spec}$ and the diffuse loss function $L_{C,diff}$.

The specular loss function $L_{C,spec}$ may be a loss function that reflects a characteristic that an intensity of illumination changes smoothly between frames captured according to the lapse of time. The specular loss function $L_{C,spec}$ may be determined based on a gradient of a weight of a specular chromaticity. The specular loss function $L_{C,spec}$ may be calculated through an L2 regularizer of a total variation as represented by Equation 8.

$$L_{C,spec} = \|\nabla \hat{C}(1,:)\|_2 \qquad \text{[Equation 8]}$$

In Equation 8, $\overline{C}$ denotes a matrix obtained by rearranging the coefficient matrix C in a form of 3×HW to be a form of an image of H×W×C.

The diffuse loss function $L_{C,diff}$ may be a loss function for reflecting a characteristic that a weight of a diffuse chromaticity is sparse for one pixel and is locally constant between neighboring pixels. For example, the diffuse loss function $L_{C,diff}$ may be a loss function for applying a characteristic that each pixel has one diffuse chromaticity and neighboring pixels are highly likely to have the same diffuse chromaticity.

The diffuse loss function $L_{C,diff}$ may be calculated by a sum of an L1 regularizer and an L2 regularizer of a total variation, as represented by Equation 9.

$$L_{C,diff} = \sum_{n=1}^{N}\|C(2:,n)\|_1 + \lambda\sum_{n=1}^{N}\|\nabla \overline{C}(2:n)\|_1 \qquad \text{[Equation 9]}$$

In Equation 9, $\lambda$ denotes a constant that is adaptively determined.

The temporal loss function $L_T$ may be a loss function that reflects a characteristic based on a change of the chromaticity dictionary matrix D and the coefficient matrix C over time. The temporal loss function $L_T$ may be determined as the sum of the temporal loss functions LDT and LCT of the chromaticity dictionary matrix D and the coefficient matrix C, respectively, as shown in Equation 10 below.

$$L_T = L_{DT} + L_{CT} \quad \text{[Equation 10]}$$

The temporal loss function $L_{DT}$ of the chromaticity dictionary matrix D may be a loss function for applying a characteristic that frames captured within a short interval of time have the same chromaticity, and preventing the sequence of chromaticities in the chromaticity dictionary matrix D from changing. The temporal loss function $L_{DT}$ of the chromaticity dictionary matrix D may be represented by Equation 11.

$$L_{DT} = \|D_{t+1} - D_t\|_2^2 \quad \text{[Equation 11]}$$

The temporal loss function $L_{CT}$ of the coefficient matrix C may be a loss function for applying a characteristic that weights of chromaticities included in the coefficient matrix C change sinusoidally based on an intensity of AC light that changes with time.

The temporal loss function $L_{CT}$ of the coefficient matrix C may be calculated based on a function $g_t(\Theta)$ that models, by a Gauss-Newton method, a characteristic that an average value of all components of the coefficient matrix C change sinusoidally based on time, as represented by Equation 12.

$$L_{CT} = (\overline{C} - g_t(\Theta))$$

where $$g_t(\Theta) = A \sin(4\pi f_{ac} t / f_{cam} + \phi) + \text{off} \quad \text{[Equation 12]}$$

In Equation 12, $f_{ac}$ may be determined based on an AC light frequency, and $f_{cam}$ may be determined based on a capturing speed.

The reconstruction loss function $L_R$ may be a loss function for minimizing a factorization error after the reconstruction of a product of a multiplication between the chromaticity dictionary matrix D and the coefficient matrix C to an input image I. The reconstruction loss function $L_R$ may be defined as a mean squared error (MSE) value as represented by Equation 13.

$$L_R = L_{MSE} = \|I - \hat{I}\|_2^2, \hat{I} = DC \quad \text{[Equation 13]}$$

The image processing apparatus 100, other apparatuses, devices, units, modules, and components described herein with respect to FIG. 1 are implemented by hardware components. Examples of hardware components that may be used to perform the operations described in this application where appropriate include controllers, sensors, generators, drivers, memories, comparators, arithmetic logic units, adders, subtractors, multipliers, dividers, integrators, and any other electronic components configured to perform the operations described in this application. In other examples, one or more of the hardware components that perform the operations described in this application are implemented by computing hardware, for example, by one or more processors or computers. A processor or computer may be implemented by one or more processing elements, such as an array of logic gates, a controller and an arithmetic logic unit, a digital signal processor, a microcomputer, a programmable logic controller, a field-programmable gate array, a programmable logic array, a microprocessor, or any other device or combination of devices that is configured to respond to and execute instructions in a defined manner to achieve a desired result. In one example, a processor or computer includes, or is connected to, one or more memories storing instructions or software that are executed by the processor or computer. Hardware components implemented by a processor or computer may execute instructions or software, such as an operating system (OS) and one or more software applications that run on the OS, to perform the operations described in this application. The hardware components may also access, manipulate, process, create, and store data in response to execution of the instructions or software. For simplicity, the singular term "processor" or "computer" may be used in the description of the examples described in this application, but in other examples multiple processors or computers may be used, or a processor or computer may include multiple processing elements, or multiple types of processing elements, or both. For example, a single hardware component or two or more hardware components may be implemented by a single processor, or two or more processors, or a processor and a controller. One or more hardware components may be implemented by one or more processors, or a processor and a controller, and one or more other hardware components may be implemented by one or more other processors, or another processor and another controller. One or more processors, or a processor and a controller, may implement a single hardware component, or two or more hardware components. A hardware component may have any one or more of different processing configurations, examples of which include a single processor, independent processors, parallel processors, single-instruction single-data (SISD) multiprocessing, single-instruction multiple-data (SIMD) multiprocessing, multiple-instruction single-data (MISD) multiprocessing, multiple-instruction multiple-data (MIMD) multiprocessing, a controller and an arithmetic logic unit (ALU), a DSP, a microcomputer, an application-specific integrated circuit (ASIC), a field programmable gate array (FPGA), a programmable logic unit (PLU), a central processing unit (CPU), a graphics processing unit (GPU), a neural processing unit (NPU), or any other device capable of responding to and executing instructions in a defined manner.

The methods illustrated in FIGS. 1-7 that perform the operations described in this application are performed by computing hardware, for example, by one or more processors or computers, implemented as described above executing instructions or software to perform the operations described in this application that are performed by the methods. For example, a single operation or two or more operations may be performed by a single processor, or two or more processors, or a processor and a controller. One or more operations may be performed by one or more processors, or a processor and a controller, and one or more other operations may be performed by one or more other processors, or another processor and another controller. One or more processors, or a processor and a controller, may perform a single operation, or two or more operations.

Instructions or software to control computing hardware, for example, one or more processors or computers, to implement the hardware components and perform the methods as described above may be written as computer programs, code segments, instructions or any combination thereof, for individually or collectively instructing or configuring the one or more processors or computers to operate as a machine or special-purpose computer to perform the operations that are performed by the hardware components and the methods as described above. In one example, the instructions or software include machine code that is directly executed by the one or more processors or computers, such as machine code produced by a compiler. In an example, the instructions or software includes at least one of an applet, a dynamic link library (DLL), middleware, firmware, a device driver, an application program storing the image processing method. In another example, the instructions or software includes higher-level code that is executed by the one or more processors or computer using an interpreter. The instructions or software may be written using any programming language based on the block diagrams and the flow charts illustrated in the drawings and the corresponding descriptions in the specification, which disclose algorithms for performing the operations that are performed by the hardware components and the methods as described above.

The instructions or software to control computing hardware, for example, one or more processors or computers, to implement the hardware components and perform the methods as described above, and any associated data, data files, and data structures, may be recorded, stored, or fixed in or on one or more non-transitory computer-readable storage media. Examples a non-transitory computer-readable storage medium include read-only memory (ROM), random-access programmable read only memory (PROM), electrically erasable programmable read-only memory (EEPROM), random-access memory (RAM), magnetic RAM (MRAM), spin-transfer torque (STT)-MRAM, static random-access memory (SRAM), thyristor RAM (T-RAM), zero capacitor RAM (Z-RAM), twin transistor RAM (TTRAM), conductive bridging RAM (CBRAM), ferroelectric RAM (FeRAM), phase change RAM (PRAM), resistive RAM (RRAM), nanotube RRAM, polymer RAM (PoRAM), nano floating gate Memory (NFGM), holographic memory, molecular electronic memory device), insulator resistance change memory, dynamic random access memory (DRAM), static random access memory (SRAM), flash memory, non-volatile memory, CD-ROMs, CD-Rs, CD+Rs, CD-RWs, CD+RWs, DVD-ROMs, DVD-Rs, DVD+Rs, DVD-RWs, DVD+RWs, DVD-RAMs, BD-ROMs, BD-Rs, BD-R LTHs, BD-REs, blue-ray or optical disk storage, hard disk drive (HDD), solid state drive (SSD), flash memory, a card type memory such as multimedia card micro or a card (for example, secure digital (SD) or extreme digital (XD)), magnetic tapes, floppy disks, magneto-optical data storage devices, optical data storage devices, hard disks, solid-state disks, and any other device that is configured to store the instructions or software and any associated data, data files, and data structures in a non-transitory manner and providing the instructions or software and any associated data, data files, and data structures to a processor or computer so that the processor or computer can execute the instructions. In an example, the instructions or software and any associated data, data files, and data structures are distributed over network-coupled computer systems so that the instructions and software and any associated data, data files, and data structures are stored, accessed, and executed in a distributed fashion by the one or more processors or computers.

While this disclosure includes specific examples, it will be apparent after an understanding of the disclosure of this application that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents.

Therefore, the scope of the disclosure is defined not by the detailed description, but by the claims and their equivalents, and all variations within the scope of the claims and their equivalents are to be construed as being included in the disclosure.

What is claimed is:

1. An image processing method comprising:
receiving an image comprising frames captured over a time period in an illumination environment comprising alternating current (AC) light;
estimating a specular chromaticity and a diffuse chromaticity of the image based on the frames using a chromaticity dictionary branch of a first neural network;
determining a weight of each of the specular chromaticity and the diffuse chromaticity based on a frame of the frames using a coefficient branch of a second neural network; and
correcting the image based on the specular chromaticity, the diffuse chromaticity, the weight of the specular chromaticity, and the weight of the diffuse chromaticity.

2. The image processing method of claim 1, wherein the weight of the specular chromaticity corresponds to a size of the specular chromaticity included in a pixel value of a pixel in the frame.

3. The image processing method of claim 1, wherein the diffuse chromaticity comprises a plurality of diffuse chromaticities corresponding to actual colors of an object present in the frame.

4. The image processing method of claim 3, wherein the weight of the diffuse chromaticity corresponds to a size of a diffuse chromaticity included in a pixel value of a pixel in the frame from among the plurality of diffuse chromaticities.

5. The image processing method of claim 1, wherein the estimating of the specular chromaticity and the diffuse chromaticity comprises:
obtaining a chromaticity dictionary matrix comprising the specular chromaticity and the diffuse chromaticity by inputting the frames to the chromaticity dictionary branch.

6. The image processing method of claim 5, wherein the obtaining of the chromaticity dictionary matrix comprises:
inputting a concatenation of the frames to the first neural network;
inputting an output of the first neural network to a plurality of third neural networks; and
concatenating respective outputs of the plurality of the third neural networks.

7. The image processing method of claim 1, wherein the estimating of the weight comprises:
obtaining a coefficient matrix comprising the weight of the specular chromaticity and the weight of the diffuse chromaticity by inputting the frame to the coefficient branch.

8. The image processing method of claim 1, wherein the correcting further comprises:
performing color balancing or highlight removal on the image based on the specular chromaticity, the diffuse chromaticity, the weight of the specular chromaticity, and the weight of the diffuse chromaticity.

9. The image processing method of claim 1, further comprising:
training the first neural network and the second neural network based on a loss function for an in-training chromaticity dictionary matrix and an in-training coefficient matrix, including:

training the first neural network, by providing a portion of training frames of a training image to a corresponding in-training first neural network, to obtain the in-training chromaticity dictionary matrix with respective training output specular chromaticity and training output diffuse chromaticity; and training the second neural network, by providing a frame of the portion of the frames of the training image to a corresponding in-training second neural network, to obtain the in-training coefficient matrix with respective training output weights with respect to specular chromaticity and diffuse chromaticity, wherein the training frames represent images captured over a training time period in a training illumination environment with alternating current (AC) light, and wherein the estimating of the specular chromaticity and the diffuse chromaticity includes obtaining the specular chromaticity and the diffuse chromaticity from a chromaticity dictionary matrix generated using the trained first neural network, and the determining of the weight of each of the specular chromaticity and the diffuse chromaticity includes obtaining the weight of each of the specular chromaticity and the diffuse chromaticity from a coefficient matrix generated using the trained second neural network.

10. An image processing apparatus comprising:
a processor configured to:
  receive an image comprising frames captured over a time period in an illumination environment comprising alternating current (AC) light;
  estimate a specular chromaticity and a diffuse chromaticity of the image based on the frames using a chromaticity dictionary branch of a first neural network;
  determine a weight of each of the specular chromaticity and the diffuse chromaticity based on a frame of the frames using a coefficient branch of a second neural network; and
  correct the image based on the specular chromaticity, the diffuse chromaticity, the weight of the specular chromaticity, and the weight of the diffuse chromaticity.

11. The image processing apparatus of claim 10, wherein the weight of the specular chromaticity corresponds to a size of the specular chromaticity included in a pixel value of a pixel in the frame.

12. The image processing apparatus of claim 10, wherein the diffuse chromaticity comprises a plurality of diffuse chromaticities corresponding to actual colors of an object present in the frame.

13. The image processing apparatus of claim 12, wherein the weight of the diffuse chromaticity corresponds to a size of a diffuse chromaticity included in a pixel value of a pixel in the frame from among the diffuse chromaticities.

14. The image processing apparatus of claim 10, wherein the processor is further configured to:
  obtain a chromaticity dictionary matrix comprising the specular chromaticity and the diffuse chromaticity by inputting the frames to the chromaticity dictionary branch.

15. The image processing apparatus of claim 14, wherein the processor is further configured to:

input a concatenation of the frames to the first neural network;
  input an output of the first neural network to a plurality of third neural networks; and
  concatenate respective outputs of the plurality of the third neural networks.

16. The image processing apparatus of claim 10, wherein the processor is further configured to:
  obtain a coefficient matrix comprising the weight of the specular chromaticity and the weight of the diffuse chromaticity by inputting the frame to the coefficient branch network.

17. The image processing apparatus of claim 10, wherein the processor is further configured to:
  perform color balancing or highlight removal on the image based on the specular chromaticity, the diffuse chromaticity, the weight of the specular chromaticity and the weight of the diffuse chromaticity.

18. A training method to train a neural network for image processing, comprising:
  receiving an image comprising frames captured over a time period in an illumination environment comprising alternating current (AC) light;
  obtaining a chromaticity dictionary matrix comprising a specular chromaticity and a diffuse chromaticity by inputting a portion of the frames to a first neural network;
  obtaining a coefficient matrix including a weight of the specular chromaticity and a weight of the diffuse chromaticity by inputting a frame of the portion of the frames to a second neural network; and
  training the first neural network and the second neural network based on a loss function for the chromaticity dictionary matrix and the coefficient matrix.

19. The training method of claim 18, wherein the loss function is determined based on a sum of:
  a reconstruction loss function based on an error between the frame and a product of a multiplication between the chromaticity dictionary matrix and the coefficient matrix;
  a color constancy loss function based on a difference between the specular chromaticity and an actual chromaticity of the AC light;
  a coefficient loss function based on each component of the coefficient matrix; and
  a temporal loss function based on a chromaticity dictionary matrix obtained for a portion of the frames and a coefficient matrix obtained for a frame among the frames.

20. The training method of claim 19, wherein the coefficient loss function is based on a sum of:
  a normalization loss function based on a sum of components of a pixel value of a pixel in the frame and a sum of column components of a coefficient matrix corresponding to the pixel;
  a specular loss function based on the weight of the specular chromaticity; and
  a diffuse loss function based on the weight of the diffuse chromaticity.

\* \* \* \* \*